(12) United States Patent
Xu et al.

(10) Patent No.: US 11,971,108 B2
(45) Date of Patent: Apr. 30, 2024

(54) ROTARY VALVE OF CRYOCOOLER AND CRYOCOOLER

(71) Applicant: SUMITOMO HEAVY INDUSTRIES, LTD., Tokyo (JP)

(72) Inventors: Mingyao Xu, Nishitokyo (JP); Qian Bao, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 722 days.

(21) Appl. No.: 17/092,322

(22) Filed: Nov. 9, 2020

(65) Prior Publication Data
US 2021/0071767 A1 Mar. 11, 2021

Related U.S. Application Data

(63) Continuation of application No. PCT/JP2019/019488, filed on May 16, 2019.

(30) Foreign Application Priority Data

May 23, 2018 (JP) ................................. 2018-098966

(51) Int. Cl.
*F16K 11/074* (2006.01)
*F16K 31/04* (2006.01)
*F25B 41/20* (2021.01)

(52) U.S. Cl.
CPC .......... *F16K 11/074* (2013.01); *F16K 31/041* (2013.01); *F25B 41/20* (2021.01); *F25B 2309/14181* (2013.01)

(58) Field of Classification Search
CPC ........ F16K 11/074; F16K 31/041; F25B 9/14; F25B 41/20; F25B 2309/006; F25B 2309/14181
See application file for complete search history.

(56) References Cited

U.S. PATENT DOCUMENTS

| 4,987,743 | A  |   | 1/1991  | Lobb |
| 6,460,349 | B1 | * | 10/2002 | Kawano ............... F16K 11/074 251/129.11 |
| 7,631,505 | B2 | * | 12/2009 | Seitz ....................... F25B 9/14 251/304 |

(Continued)

FOREIGN PATENT DOCUMENTS

| JP | H0278864 A   | 3/1990  |
| JP | 2008544199 A | 12/2008 |
| JP | 2014145573 A | 8/2014  |

*Primary Examiner* — Matthew W Jellett
(74) *Attorney, Agent, or Firm* — HEA LAW PLLC (57) ABSTRACT

A rotary valve of a cryocooler includes a valve stator, a valve rotor, a rotation member that rotates the valve rotor around an axis with respect to the valve stator, and a rotor holder connected to the valve rotor so as to rotate around an axis together with the valve rotor, and forming a low pressure section having a pressure lower than an ambient pressure between the valve rotor and the rotor holder so as to reduce an axial force of pressing the valve rotor against the valve stator. The rotation member is connected to the rotor holder so as to rotate the valve rotor around the axis via the rotor holder. The rotor holder is disposed between the rotation member and the valve rotor in an axial direction, and is movable in the axial direction with respect to the rotation member.

13 Claims, 7 Drawing Sheets

(56) References Cited

U.S. PATENT DOCUMENTS

| | | | |
|---|---|---|---|
| 7,997,088 B2* | 8/2011 | Longsworth | F25B 9/145 |
| | | | 60/517 |
| 9,188,238 B2* | 11/2015 | Tanaka | G01N 30/20 |
| 10,018,380 B2 | 7/2018 | Morie et al. | |
| 2015/0001428 A1 | 1/2015 | Xu et al. | |
| 2016/0025690 A1* | 1/2016 | Yasunaga | G01N 30/28 |
| | | | 137/625.41 |
| 2017/0184328 A1* | 6/2017 | Morie | F16K 11/074 |

\* cited by examiner

ROTARY VALVE OF CRYOCOOLER AND CRYOCOOLER

RELATED APPLICATIONS

The contents of Japanese Patent Application No. 2018-098966, and of International Patent Application No. PCT/JP2019/019488, on the basis of each of which priority benefits are claimed in an accompanying application data sheet, are in their entirety incorporated herein by reference.

BACKGROUND

Technical Field

Certain embodiments of the present invention relate to a cryocooler and a rotary valve unit for a cryocooler.

Description of Related Art

In a cryocooler such as a Gifford-McMahon (GM) cryocooler and a pulse tube cryocooler, a rotary valve is generally used to alternately switch between intake and exhaust of working gas to a cold head.

A configuration of a certain rotary valve includes a stationary valve plate and a valve head rotated around an axis by a motor. Several ports through which working gas flows are provided in an interface portion between the valve plate and the valve head. In the interface portion, a pressure of the working gas acts to press the valve head against the valve plate. In this manner, the ports are sealed to each other, and each port can have a required different pressure. The valve head is rotated with respect to the valve plate to switch connection between the ports. Accordingly, intake and exhaust of the working gas to the cold head are available.

SUMMARY

According to an embodiment of the present invention, there is provided a rotary valve of a cryocooler. The rotary valve includes a valve stator, a valve rotor, a rotation member that rotates the valve rotor around an axis with respect to the valve stator, and a rotor holder connected to the valve rotor so as to rotate around the axis together with the valve rotor, and forming a low pressure section having a pressure lower than an ambient pressure between the valve rotor and the rotor holder so as to reduce an axial force of pressing the valve rotor against the valve stator. The rotation member is connected to the rotor holder so as to rotate the valve rotor around the axis via the rotor holder. The rotor holder is disposed between the rotation member and the valve rotor in an axial direction, and is movable in the axial direction with respect to the rotation member.

DETAILED DESCRIPTION

In the above-described valve configuration, a low pressure bore is formed on a surface of the valve head on a side opposite to the interface portion in a rotation axis direction. The bore serves to weaken a force of pressing the valve head against the valve plate in the axial direction. A frictional force is reduced in the interface portion when the valve head is rotated, and a drive torque of the motor can be reduced. However, a tip of an extension member extending from a motor shaft enters the bore to seal the bore. Therefore, due to a pressure difference between high ambient pressure and a low pressure of the bore, a force is generated to pull the extension member and the motor shaft from the motor in an axial direction. The pulling force may apply an excessive load to a component inside the motor, for example, such as a bearing that supports the motor shaft. The excessive load may cause a disadvantage in that a life of the motor is shortened. Alternatively, in a case of using a sturdy motor that withstands the pulling force, manufacturing costs may increase.

It is desirable to provide a technique for reducing a drive torque of a rotary valve of a cryocooler at a lower cost.

Any desired combinations of the above-described components or those in which components or expressions according to the present invention are substituted with each other in methods, devices, and systems may be effectively adopted as an aspect of the present invention.

Hereinafter, an embodiment according to the present invention will be described in detail. Configurations described below are merely examples, and do not limit the scope of the present invention at all. In addition, the same reference numerals will be assigned to the same elements in describing the drawings, and repeated description will be appropriately omitted. In addition, in the drawings referred to in the following description, a size or a thickness of each configuration member is set for convenience of the description, and does not necessarily indicate an actual dimension or ratio.

Figure 1:
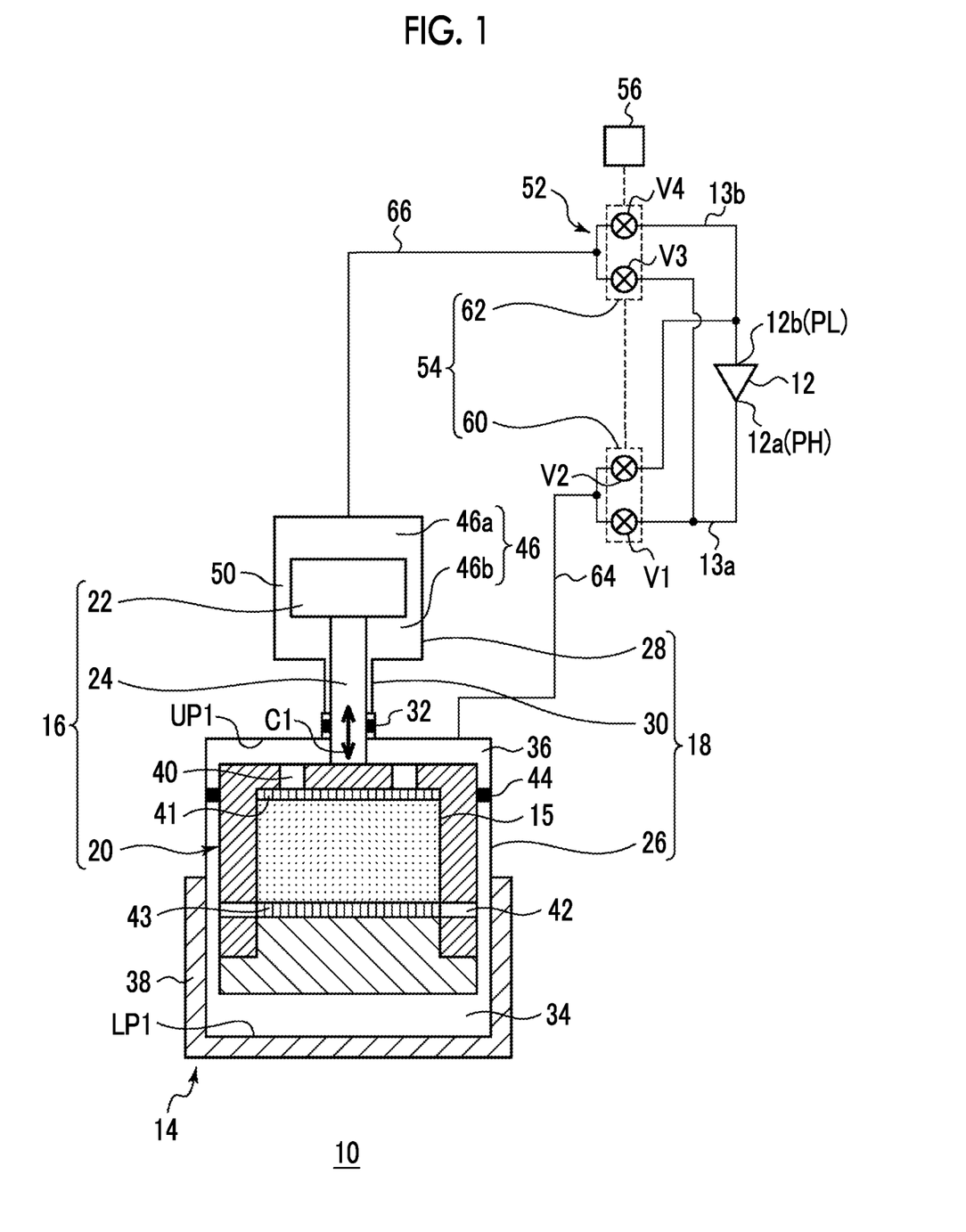
FIG. 1 is a view schematically illustrating cryocooler according to an embodiment.

FIG. 1 is a view schematically illustrating a cryocooler 10 according to the embodiment. As an example, the cryocooler 10 is a gas-driven GM cryocooler.

The GM cryocooler 10 includes a compressor 12 which compresses working gas (for example, helium gas) and a cold head 14 which cools the working gas through adiabatic expansion. The compressor 12 has a compressor discharge port 12a and a compressor suction port 12b. The compressor discharge port 12a and the compressor suction port 12b respectively function as a high pressure source and a low pressure source of the cryocooler 10. The cold head 14 is also called an expander.

As will be described in detail later, the compressor 12 supplies high pressure (PH) working gas from the compressor discharge port 12a to the cold head 14. The cold head 14 includes a regenerator 15 which pre-cools the working gas. The precooled working gas is further cooled through expansion inside the cold head 14. The working gas is recovered to the compressor suction port 12b through the regenerator 15. The working gas cools the regenerator 15 when the working gas passes through the regenerator 15. The compressor 12 compresses the recovered low pressure (PL) working gas, and supplies the working gas to the cold head 14 again.

The illustrated cold head 14 is a single stage type. However, the cold head 14 may be a multi-stage type.

The cold head 14 is a gas-driven type. Accordingly, the cold head 14 includes an axially movable body 16 serving as a free piston driven by a gas pressure, and a cold head housing 18 configured to be hermetic and accommodating the axially movable body 16. The cold head housing 18 supports the axially movable body 16 to be capable of reciprocating in an axial direction. Unlike a motor-driven type GM cryocooler, the cold head 14 does not have a motor for driving the axially movable body 16 and a connecting mechanism (for example, a scotch yoke mechanism).

The axially movable body 16 includes a displacer 20 capable of reciprocating in the axial direction (upward-downward direction in FIG. 1, indicated by an arrow C1), and a drive piston 22 connected to the displacer 20 to drive the displacer 20 in the axial direction. The drive piston 22 is disposed coaxially with and apart from the displacer 20 in the axial direction.

The cold head housing 18 includes a displacer cylinder 26 which accommodates the displacer 20, and a piston cylinder 28 which accommodates the drive piston 22. The piston cylinder 28 is located coaxially with and adjacent to the displacer cylinder 26 in the axial direction. Although details will be described later, a drive part of the cold head 14 which is a gas-driven type is configured to include the drive piston 22 and the piston cylinder 28.

In addition, the axially movable body 16 includes a connecting rod 24 that rigidly connects the displacer 20 to the drive piston 22 so that the displacer 20 reciprocates integrally with the drive piston 22 in the axial direction. The connecting rod 24 extends coaxially with the displacer 20 and the drive piston 22 from the displacer 20 to the drive piston 22.

The drive piston 22 has a smaller dimension than that of the displacer 20. An axial length of the drive piston 22 is shorter than that of the displacer 20, and a diameter of the drive piston 22 is smaller than that of the displacer 20. The diameter of the connecting rod 24 is smaller than that of the drive piston 22.

A volume of the piston cylinder 28 is smaller than that of the displacer cylinder 26. The axial length of the piston cylinder 28 is shorter than that of the displacer cylinder 26, and the diameter of the piston cylinder 28 is smaller than that of the displacer cylinder 26.

A dimensional relationship between the drive piston 22 and the displacer 20 is not limited to the above-described relationship, and may be different therefrom. Similarly, the dimensional relationship between the piston cylinder 28 and the displacer cylinder 26 is not limited to the above-described relationship, and may be different therefrom. For example, the drive piston 22 may be a tip part of the connecting rod 24, and the diameter of the drive piston 22 may be equal to the diameter of the connecting rod 24.

Axial reciprocation of the displacer 20 is guided by the displacer cylinder 26. In general, the displacer 20 and the displacer cylinder 26 are cylindrical members which respectively extend in the axial direction, and an inner diameter of the displacer cylinder 26 coincides with or slightly larger than an outer diameter of the displacer 20. Similarly, the axial reciprocation of the drive piston 22 is guided by the piston cylinder 28. In general, the drive piston 22 and the piston cylinder 28 are cylindrical members which respectively extend in the axial direction, and the inner diameter of the piston cylinder 28 coincides with or slightly larger than the outer diameter of the drive piston 22.

The displacer 20 and the drive piston 22 are rigidly connected to each other in the axial direction by the connecting rod 24. Accordingly, an axial stroke of the drive piston 22 is equal to an axial stroke of the displacer 20, and both of these integrally move over all strokes. A position of the drive piston 22 with respect to the displacer 20 is unchanged during the axial reciprocation of the axially movable body 16.

In addition, the cold head housing 18 includes a connecting rod guide 30 which connects the displacer cylinder 26 to the piston cylinder 28. The connecting rod guide 30 extends coaxially with the displacer cylinder 26 and the piston cylinder 28 from the displacer cylinder 26 to the piston cylinder 28. The connecting rod 24 penetrates the connecting rod guide 30. The connecting rod guide 30 is configured to serve as a bearing which guides the axial reciprocation of the connecting rod 24.

The displacer cylinder 26 is hermetically connected to the piston cylinder 28 via the connecting rod guide 30. In this way, the cold head housing 18 is configured to serve as a pressure vessel for the working gas. The connecting rod guide 30 may be considered to be a portion of either the displacer cylinder 26 or the piston cylinder 28.

A first seal portion 32 is provided between the connecting rod 24 and the connecting rod guide 30. The first seal portion 32 is mounted on one of the connecting rod 24 and the connecting rod guide 30, and slides on the other of the connecting rod 24 and the connecting rod guide 30. For example, the first seal portion 32 is configured to include a sealing member such as a slipper seal or an O-ring. The piston cylinder 28 is configured to be hermetic with respect to the displacer cylinder 26 by the first seal portion 32. In this way, the piston cylinder 28 is fluidly isolated from the displacer cylinder 26, and a different magnitude can be generated between an internal pressure of the piston cylinder 28 and an internal pressure of the displacer cylinder 26. Since the first seal portion 32 is provided, there is no direct gas circulation between the piston cylinder 28 and the displacer cylinder 26.

The displacer cylinder 26 is divided into an expansion chamber 34 and a room temperature chamber 36 by the displacer 20. The displacer 20 forms the expansion chamber 34 with the displacer cylinder 26 in one end in the axial direction, and forms the room temperature chamber 36 with the displacer cylinder 26 in the other end in the axial direction. The room temperature chamber 36 can also be called a compression chamber. The expansion chamber 34 is disposed on a bottom dead center LP1 side of the displacer 20, and the room temperature chamber 36 is disposed on a top dead center UP1 side of the displacer 20. In addition, the cold head 14 is provided with a cooling stage 38 fixed to the displacer cylinder 26 so as to wrap the expansion chamber 34.

The regenerator 15 is incorporated in the displacer 20. An upper lid portion of the displacer 20 has an inlet flow path 40 through which the regenerator 15 communicates with the room temperature chamber 36. In addition, a cylinder portion of the displacer 20 has an outlet flow path 42 through which the regenerator 15 communicates with the expansion chamber 34. Alternatively, the outlet flow path 42 may be provided in a lower lid portion of the displacer 20. In addition, the regenerator 15 includes an inlet retainer 41 inscribed in the upper lid portion and an outlet retainer 43 inscribed in the lower lid portion. A regenerator material may be a copper wire mesh, for example. The retainer may be a wire mesh which is coarser than the regenerator material.

A second seal portion 44 is provided between the displacer 20 and the displacer cylinder 26. For example, the second seal portion 44 is a slipper seal, and is mounted on the cylinder portion or the upper lid portion of the displacer 20. A clearance between the displacer 20 and the displacer cylinder 26 is sealed by the second seal portion 44. Accordingly, there is no direct gas circulation (that is, a gas flow bypassing the regenerator 15) between the room temperature chamber 36 and the expansion chamber 34.

When the displacer 20 moves in the axial direction, the expansion chamber 34 and the room temperature chamber 36 complementarily increase and decrease respective volumes. That is, when the displacer 20 moves downward, the expansion chamber 34 is narrowed, and the room temperature chamber 36 is widened. And vice versa.

The working gas flows into the regenerator 15 from the room temperature chamber 36 through the inlet flow path 40. More precisely, the working gas flows into the regenerator 15 from the inlet flow path 40 through the inlet retainer 41. The working gas flows into the expansion chamber 34 from the regenerator 15 by way of the outlet retainer 43 and the outlet flow path 42. When the working gas returns to the room temperature chamber 36 from the expansion chamber 34, the working gas passes a reverse path thereof. That is, the working gas returns to the room temperature chamber 36 from the expansion chamber 34 through the outlet flow path 42, the regenerator 15, and the inlet flow path 40. The working gas trying to flow into the clearance after bypassing the regenerator 15 is blocked by the second seal portion 44.

The piston cylinder 28 includes a drive chamber 46 whose pressure is controlled to drive the drive piston 22. The drive chamber 46 corresponds to an internal space of the piston cylinder 28. The drive chamber 46 is divided by the drive piston 22 into an upper section 46a and a lower section 46b. The drive piston 22 forms the upper section 46a with the piston cylinder 28 in one end in the axial direction, and forms the lower section 46b with the piston cylinder 28 in the other end in the axial direction. When the drive piston 22 moves in the axial direction, the upper section 46a and the lower section 46b complementarily increase and decrease the respective volumes. The connecting rod 24 extends to the connecting rod guide 30 from a lower surface of the drive piston 22 through the lower section 46b. Furthermore, the connecting rod 24 extends to the upper lid portion of the displacer 20 through the room temperature chamber 36.

A third seal portion 50 which is a clearance between the drive piston 22 and the piston cylinder 28 is provided between the drive piston 22 and the piston cylinder 28. The third seal portion 50 acts as a flow path resistance to the gas circulation in the upper section 46a and the lower section 46b. The third seal portion 50 may have a sealing member such as a slipper seal mounted on a side surface of the drive piston 22 so as to seal the clearance. In this case, the lower section 46b of the drive chamber 46 is sealed by the first seal portion 32 and the third seal portion 50.

The lower section 46b is narrowed when the drive piston 22 moves downward. At this time, the gas of the lower section 46b is compressed, and the pressure increases. The pressure of the lower section 46b acts upward on the lower surface of the drive piston 22. Accordingly, the lower section 46b generates a gas spring force which acts against the downward movement of the drive piston 22. The lower section 46b can also be called a gas spring chamber. Conversely, the lower section 46b is widened when the drive piston 22 moves upward. The pressure of the lower section 46b decreases, and the gas spring force acting on the drive piston 22 decreases.

The cold head 14 is installed in an illustrated direction at a job site where the cold head 14 is used. That is, the cold head 14 is installed vertically upward by disposing the displacer cylinder 26 below in the vertical direction and disposing the piston cylinder 28 above in the vertical direction, respectively. In this way, the cryocooler 10 has the highest cooling capacity when the cooling stage 38 is installed by adopting a downward facing posture in the vertical direction. However, disposition of the cryocooler 10 is not limited thereto. Conversely, the cold head 14 may be installed by adopting a posture in which the cooling stage 38 faces upward in the vertical direction. Alternatively, the cold head 14 may be installed sideways or in any other direction.

A driving force applied to the drive piston 22 by the working gas pressure acts downward on the drive piston 22 when the drive piston 22 moves downward. Gravity also works downward due to its own weight of the axially movable body 16. Accordingly, when the cold head 14 is installed by adopting a posture in which the cooling stage 38 faces downward in the vertical direction, the driving force during the downward movement has an orientation the same as an orientation of the gravity. On the other hand, the driving force during the upward movement has an orientation opposite to an orientation of the gravity. The gas spring force acting on the drive piston 22 from the gas spring chamber (that is, the lower section 46b of the drive chamber 46) reduces or prevents a behavior difference between the upward movement and the downward movement of the axially movable body 16.

Furthermore, the cryocooler 10 includes a working gas circuit 52 which connects the compressor 12 to the cold head 14. The working gas circuit 52 is configured to generate a pressure difference between the piston cylinder 28 (that is, the drive chamber 46) and the displacer cylinder 26 (that is, the expansion chamber 34 and/or the room temperature chamber 36). The pressure difference causes the axially movable body 16 to move in the axial direction. When the pressure of the displacer cylinder 26 is lower than that of the piston cylinder 28, the drive piston 22 moves downward, and consequently, the displacer 20 also moves downward. Conversely, when the pressure of the displacer cylinder 26 is higher than that of the piston cylinder 28, the drive piston 22 moves upward, and consequently, the displacer 20 also moves upward.

The working gas circuit 52 includes a rotary valve 54. The rotary valve 54 may be disposed in the cold head housing 18, and may be connected to the compressor 12 by using a pipe. The rotary valve 54 may be disposed outside the cold head housing 18, and may be connected to each of the compressor 12 and the cold head 14 by using a pipe.

The rotary valve 54 includes an expansion chamber pressure switching valve (hereinafter, also referred to as a main pressure switching valve) 60 and a drive chamber pressure switching valve (hereinafter, also referred to as an auxiliary pressure switching valve) 62. The main pressure switching valve 60 has a main intake valve V1 and a main exhaust valve V2. The auxiliary pressure switching valve 62 has an auxiliary intake valve V3 and an auxiliary exhaust valve V4.

The working gas circuit 52 includes a high pressure line 13a and a low pressure line 13b which connect the compressor 12 to the rotary valve 54. The high pressure line 13a extends from the compressor discharge port 12a, branches in an intermediate portion, and is connected to the main intake valve V1 and the auxiliary intake valve V3. The low pressure line 13b extends from the compressor suction port 12b, branches in an intermediate portion, and is connected to the main exhaust valve V2 and the auxiliary exhaust valve V4.

In addition, the working gas circuit 52 includes a main communication passage 64 and an auxiliary communication passage 66 which connect the cold head 14 to the rotary valve 54. The main communication passage 64 connects the displacer cylinder 26 to the main pressure switching valve 60. The main communication passage 64 extends from the room temperature chamber 36, branches in an intermediate portion, and is connected to the main intake valve V1 and the main exhaust valve V2. The auxiliary communication passage 66 connects the drive chamber 46 to the auxiliary pressure switching valve 62. The auxiliary communication passage 66 extends from the upper section 46a of the drive chamber 46, branches in an intermediate portion, and is connected to the auxiliary intake valve V3 and the auxiliary exhaust valve V4.

The main pressure switching valve 60 is configured so that the compressor discharge port 12a or the compressor suction port 12b selectively communicates with the room temperature chamber 36 of the displacer cylinder 26. In the main pressure switching valve 60, the main intake valve V1 and the main exhaust valve V2 are respectively and exclusively opened. That is, the main intake valve V1 and the main exhaust valve V2 are inhibited from being opened at the same time. The main intake valve V1 and the main exhaust valve V2 may be temporarily closed together.

When the main intake valve V1 is open, the main exhaust valve V2 is closed. The working gas flows from the compressor discharge port 12a to the displacer cylinder 26 through the high pressure line 13a and the main communication passage 64. As described above, the working gas flows from the room temperature chamber 36 to the expansion chamber 34 through the regenerator 15. In this way, the working gas of high pressure PH is supplied from the compressor 12 to the expansion chamber 34, and the expansion chamber 34 is pressurized. Conversely, when the main intake valve V1 is closed, the supply of the working gas from the compressor 12 to the expansion chamber 34 is stopped.

On the other hand, when the main exhaust valve V2 is open, the main intake valve V1 is closed. First, the working gas of the high pressure PH is expanded and decompressed in the expansion chamber 34. The working gas flows from the expansion chamber 34 to the room temperature chamber 36 through the regenerator 15. The working gas flows from the displacer cylinder 26 to the compressor suction port 12b through the main communication passage 64 and the low pressure line 13b. In this way, the working gas of low pressure PL is recovered from the cold head 14 to the compressor 12. When the main exhaust valve V2 is closed, the recovery of the working gas from the expansion chamber 34 to the compressor 12 is stopped.

The auxiliary pressure switching valve 62 is configured so that the compressor discharge port 12a or the compressor suction port 12b selectively communicates with the drive chamber 46 of the piston cylinder 28. The auxiliary pressure switching valve 62 is configured so that the auxiliary intake valve V3 and the auxiliary exhaust valve V4 are respectively and exclusively opened. That is, the auxiliary intake valve V3 and the auxiliary exhaust valve V4 are inhibited from being opened at the same time. The auxiliary intake valve V3 and the auxiliary exhaust valve V4 may be temporarily closed together.

When the auxiliary intake valve V3 is open, the auxiliary exhaust valve V4 is closed. The working gas flows from the compressor discharge port 12a to the piston cylinder 28 through the high pressure line 13a and the auxiliary communication passage 66. In this way, the working gas of the high pressure PH is supplied from the compressor 12 to the drive chamber 46, and the drive chamber 46 is pressurized. When the auxiliary intake valve V3 is closed, the supply of the working gas from the compressor 12 to the drive chamber 46 is stopped.

On the other hand, when the auxiliary exhaust valve V4 is open, the auxiliary intake valve V3 is closed. The working gas is recovered from the drive chamber 46 to the compressor suction port 12b through the auxiliary communication passage 66 and the low pressure line 13b, and the drive chamber 46 is decompressed to the low pressure PL. When the auxiliary exhaust valve V4 is closed, the recovery of the working gas from the drive chamber 46 to the compressor 12 is stopped.

In this way, the main pressure switching valve 60 generates periodic pressure fluctuations of the high pressure PH and the low pressure PL in the expansion chamber 34. In addition, the auxiliary pressure switching valve 62 generates periodic pressure fluctuations of the high pressure PH and the low pressure PL in the drive chamber 46.

The auxiliary pressure switching valve 62 is configured to control the pressure of the drive chamber 46 so that the drive piston 22 drives the axial reciprocation of the displacer 20. Typically, the pressure fluctuations in the drive chamber 46 are generated in a substantially opposite phase and in the same cycle as the pressure fluctuations in the expansion chamber 34. When the expansion chamber 34 has the high pressure PH, the drive chamber 46 has the low pressure PL, and the drive piston 22 can move the displacer 20 upward. When the expansion chamber 34 has the low pressure PL, the drive chamber 46 has the high pressure PH, and the drive piston 22 can move the displacer 20 downward.

A group of valves (V1 to V4) is incorporated in the rotary valve 54, and the valves are synchronously driven. The rotary valve 54 is configured so that the valves (V1 to V4) are properly switched by rotational sliding of a valve disc (or a valve rotor) with respect to a valve main body (or a valve stator). The group of valves (V1 to V4) is switched in the same cycle during an operation of the cryocooler 10. In this manner, the four on-off valves (V1 to V4) periodically changes an open/closed state. The four on-off valves (V1 to V4) are opened and closed in respectively different phases.

The cryocooler 10 may include a rotation drive source 56 connected to the rotary valve 54 to rotate the rotary valve 54. The rotation drive source 56 is mechanically connected to the rotary valve 54. The rotation drive source 56 is a motor, for example. However, the rotation drive source 56 is not mechanically connected to the axially movable body 16.

Figure 2:
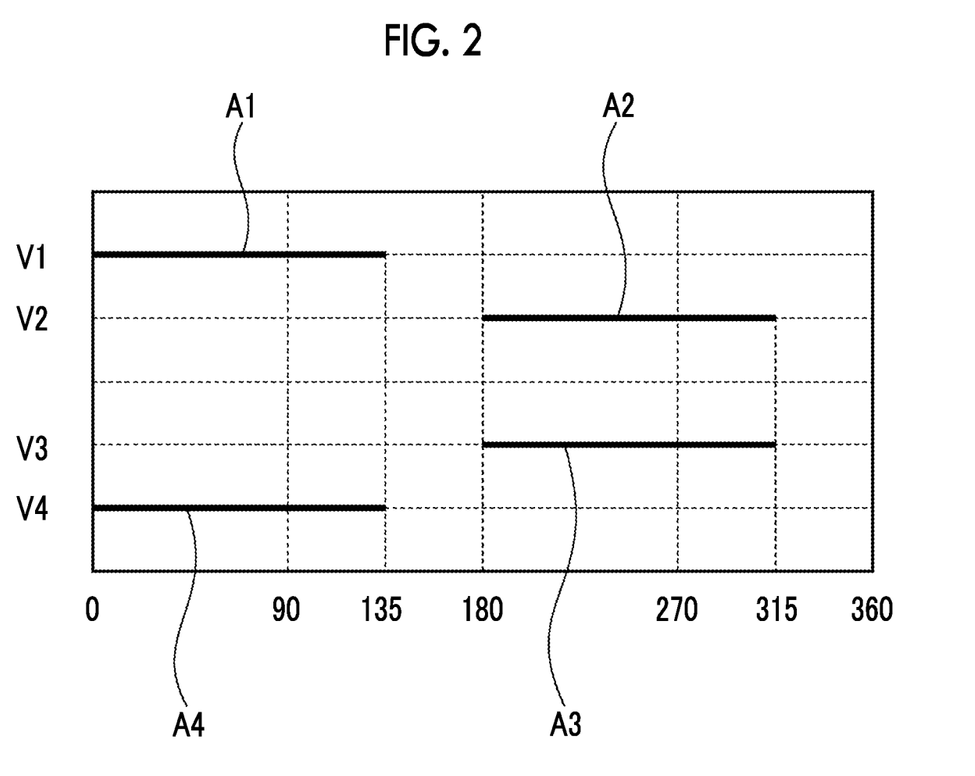
FIG. 2 is a view illustrating an example of an operation of the cryocooler.

FIG. 2 is a view illustrating an example of an operation of the cryocooler 10. FIG. 2 illustrates that one cycle of the axial reciprocation of the axially movable body 16 is associated with 360 degrees. Accordingly, 0 degrees correspond to a start point of the cycle, and 360 degrees correspond to an end point of the cycle. 90 degrees, 180 degrees, and 270 degrees respectively correspond to the ¼ cycle, the half cycle, and the ¾ cycle. At 0 degrees, the displacer 20 is located at or near the bottom dead center LP1, and at 180 degrees, the displacer 20 is located at or near the top dead center UP1.

FIG. 2 illustrates a main intake period A1 and a main exhaust period A2 of the cold head 14, and an auxiliary intake period A3 and an auxiliary exhaust period A4 of the drive chamber 46. The main intake period A1 represents a period during which the main intake valve V1 is open, and the main exhaust period A2 represents a period during which the main exhaust valve V2 is open. Similarly, the auxiliary intake period A3 represents a period during which the auxiliary intake valve V3 is open, and the auxiliary exhaust period A4 represents a period during which the auxiliary exhaust valve V4 is open.

In the example illustrated in FIG. 2, the main intake period A1 and the auxiliary exhaust period A4 are in a range of 0 degrees to 135 degrees, and the main exhaust period A2 and the auxiliary intake period A3 are in a range of 180 degrees to 315 degrees. The main intake period A1 is alternate with the main exhaust period A2, and does not overlap the main exhaust period A2. The auxiliary intake period A3 is alternate with the auxiliary exhaust period A4, and does not overlap the auxiliary exhaust period A4. The main intake period A1 overlaps the auxiliary exhaust period A4, and the main exhaust period A2 overlaps the auxiliary intake period A3.

An operation of the cryocooler 10 having the above-described configuration will be described. When the displacer 20 is located at or near the bottom dead center LP1, the main intake period A1 starts (0 degrees in FIG. 2). The main intake valve V1 is opened, and the high pressure gas is supplied from the discharge port of the compressor 12 to the room temperature chamber 36 of the cold head 14. The gas is cooled while passing through the regenerator 15, and enters the expansion chamber 34.

The auxiliary exhaust period A4 also starts simultaneously with the main intake period A1 (0 degrees in FIG. 2). The auxiliary exhaust valve V4 is opened, and the drive chamber 46 of the piston cylinder 28 is connected to the suction port of the compressor 12. Therefore, the drive chamber 46 has a low pressure than the room temperature chamber 36 and the expansion chamber 34. The drive piston 22 moves from the bottom dead center toward the top dead center.

The displacer 20 moves together with the drive piston 22 from the bottom dead center LP1 toward the top dead center UP1. The main intake valve V1 is closed, and the main intake period A1 ends (135 degrees in FIG. 2). The auxiliary exhaust valve V4 is closed, and the auxiliary exhaust period A4 ends (135 degrees in FIG. 2). The drive piston 22 and the displacer 20 continue to move toward the top dead center UP1. In this way, a volume of the expansion chamber 34 increases, and the expansion chamber 34 is filled with the high pressure gas.

When the displacer 20 is located at or near the top dead center UP1, the main exhaust period A2 starts (180 degrees in FIG. 2). The main exhaust valve V2 is opened, and the cold head 14 is connected to the suction port of the compressor 12. The high pressure gas is expanded and cooled in the expansion chamber 34. The expanded gas is recovered by the compressor 12 through the room temperature chamber 36 while cooling the regenerator 15.

The auxiliary intake period A3 also starts together with the main exhaust period A2 (180 degrees in FIG. 2). The auxiliary intake valve V3 is opened, and the high pressure gas is supplied from the discharge port of the compressor 12 to the drive chamber 46 of the piston cylinder 28. Therefore, the drive chamber 46 has a high pressure than the room temperature chamber 36 and the expansion chamber 34. The drive piston 22 moves from the top dead center toward the bottom dead center.

The displacer 20 moves together with the drive piston 22 from the top dead center UP1 toward the bottom dead center LP1. The main exhaust valve V2 is closed, and the main exhaust period A2 ends (315 degrees in FIG. 2). The auxiliary intake valve V3 is closed, and the auxiliary intake period A3 ends (315 degrees in FIG. 2). The drive piston 22 and the displacer 20 continue to move toward the bottom dead center LP1. In this way, the volume of the expansion chamber 34 decreases, and the low pressure gas is discharged.

The cold head 14 cools the cooling stage 38 by repeating a cooling cycle (that is, a GM cycle) in this way. In this manner, the cryocooler 10 can cool a superconducting device or other cooling objects (not illustrated) thermally connected to the cooling stage 38.

Figure 3:
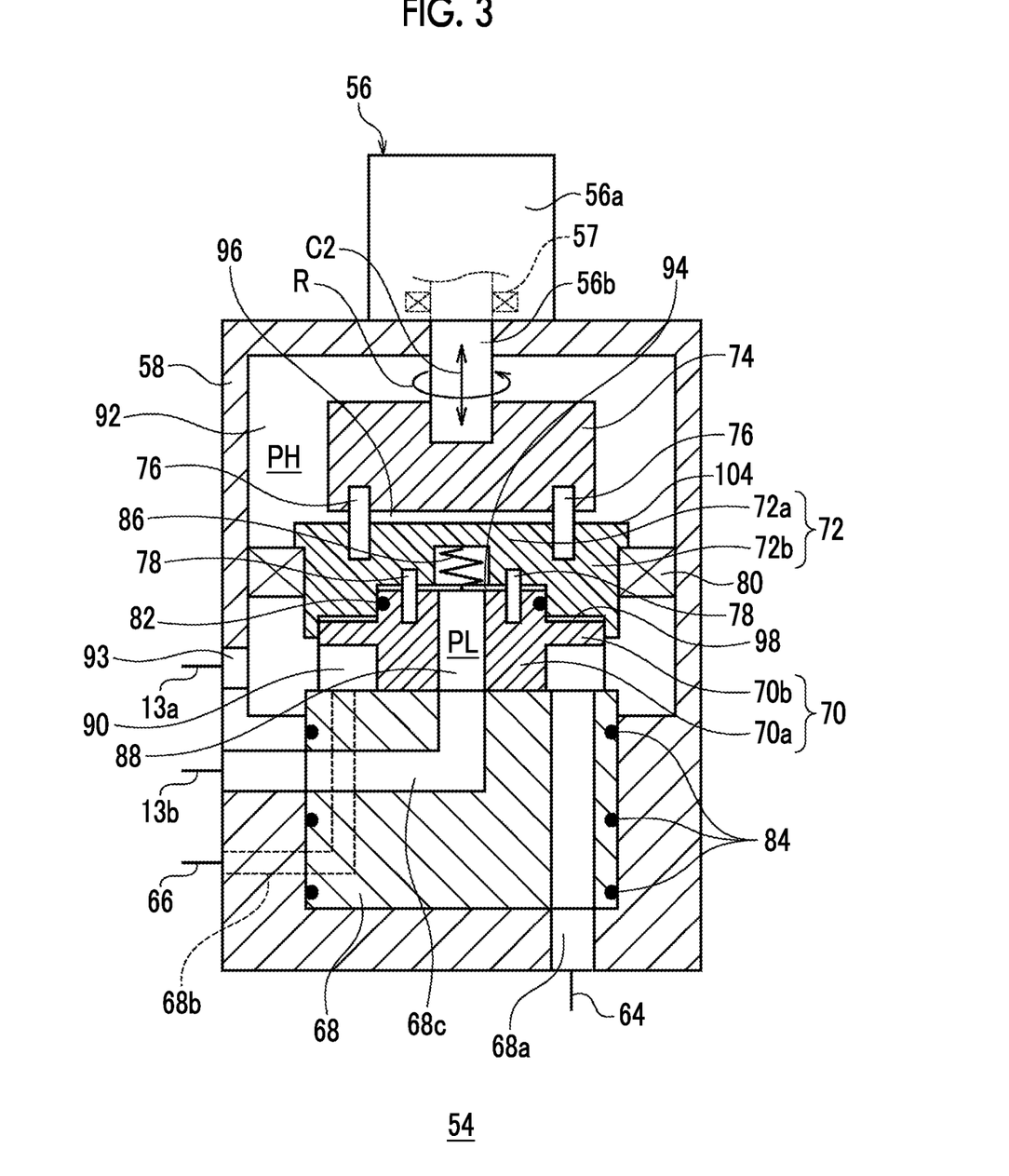
FIG. 3 is a view schematically illustrating a rotary valve of the cryocooler according to the embodiment.
Figure 4:
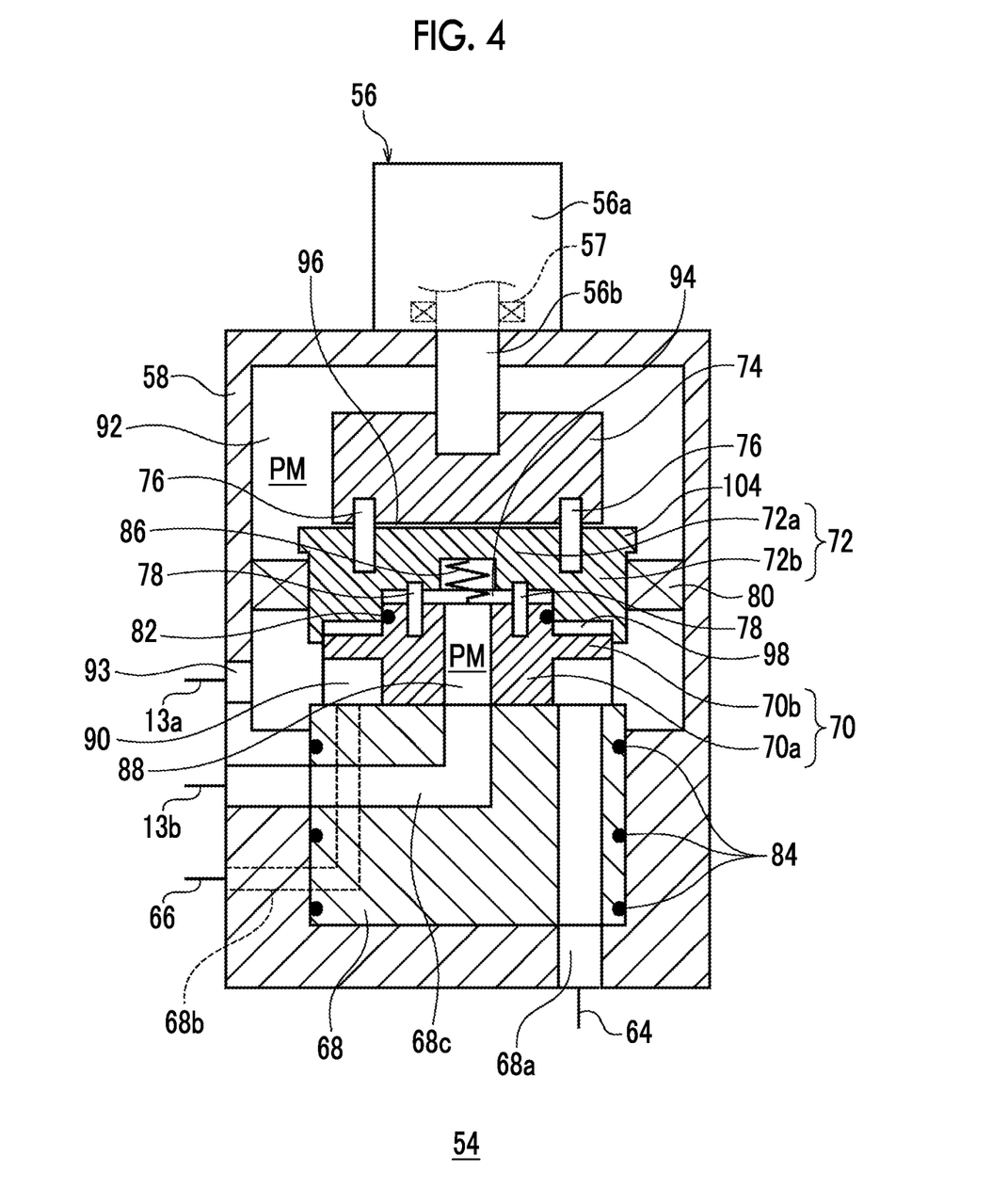
FIG. 4 is a view schematically illustrating the rotary valve of the cryocooler according to the embodiment.

FIGS. 3 and 4 are views schematically illustrating the rotary valve 54 of the cryocooler 10 according to the embodiment. FIG. 3 illustrates a state of the rotary valve 54 during the operation of the cryocooler 10, and FIG. 4 illustrates a state of the rotary valve 54 during stopping of the cryocooler 10.

As illustrated in FIG. 3, during the operation of the cryocooler 10, the working gas of the high pressure PH is introduced into the rotary valve 54 from the high pressure line 13a, and the working gas of the low pressure PL is introduced into the rotary valve 54 from the low pressure line 13b. The rotary valve 54 is configured to hold a pressure difference between the high pressure PH and the low pressure PL. On the other hand, as illustrated in FIG. 4, the pressure of the working gas is equalized during stopping of the cryocooler 10. Accordingly, an intermediate pressure PM (for example, average pressure of the high pressure PH and the low pressure PL) is introduced from both the high pressure line 13a and the low pressure line 13b. Therefore, during stopping of the cryocooler 10, a pressure difference does not act on the rotary valve 54 unlike during the operation.

The rotary valve 54 includes a valve housing 58, a valve stator 68, a valve rotor 70, a rotor holder 72, and a rotation member 74. In addition, the rotary valve 54 includes a plurality of first connecting pins 76, a plurality of second connecting pins 78, a valve bearing 80, a rotor sealing member 82, a stator sealing member 84, and a first spring 86.

The rotation drive source 56 includes a motor main body 56a and a motor shaft 56b. The motor main body 56a is installed on an outer surface of the valve housing 58, and the motor shaft 56b extends from the motor main body 56a to the inside of the valve housing 58 by penetrating the valve housing 58. The motor shaft 56b extends in the axial direction (in the upward-downward direction in FIGS. 3 and 4, indicated by an arrow C2) of the rotary valve 54. The motor main body 56a is driven, thereby rotating the motor shaft 56b around the axis (indicated by an arrow R in FIGS. 3 and 4). In the rotation drive source 56, the motor main body 56a may internally have at least one motor bearing 57 that supports the motor shaft 56b to be rotatable around the axis.

The motor shaft 56b, the rotation member 74, the rotor holder 72, the valve rotor 70, and the valve stator 68 are coaxially disposed in this order along an axial direction C2 of the rotary valve 54. The rotation member 74, the rotor holder 72, and the valve rotor 70 are respectively separate components, but are connected to each other to rotate integrally in response to the rotation around the axis of the motor shaft 56b.

The valve housing 58 is a hermetic container that accommodates the valve stator 68, the valve rotor 70, the rotor holder 72, the rotation member 74, and other components of the rotary valve 54. The high pressure line 13a, the low pressure line 13b, the main communication passage 64, and the auxiliary communication passage 66 are connected to the valve housing 58. Through all of these, the working gas can flow into or flow out from the rotary valve 54.

The valve stator 68 has a regenerator flow path 68a, a drive chamber flow path 68b, and a stator low pressure flow path 68c. The regenerator flow path 68a, the drive chamber flow path 68b, and the stator low pressure flow path 68c are holes that penetrate the valve stator 68, and one ends thereof are located at mutually different position on the upper surface of the valve stator 68. The other ends of the regenerator flow path 68a, the drive chamber flow path 68b, and the stator low pressure flow path 68c respectively penetrate the valve housing 58, and communicate with the main communication passage 64, the auxiliary communication passage 66, and the low pressure line 13b.

Typically, the valve stator 68 has a cylindrical shape, and the valve housing 58 has a recess portion having a shape corresponding thereto. The valve stator 68 is fitted into the recess portion of the valve housing 58, and is fixed to the valve housing 58. The plurality of stator sealing members 84 are disposed at mutually different positions in the axial direction C2 between a peripheral surface of the valve stator 68 and a surface of the recess portion of the valve housing 58 that is in contact with the peripheral surface. The regenerator flow path 68a, the drive chamber flow path 68b, and the stator low pressure flow path 68c are mutually sealed by the stator sealing member 84, thereby preventing a leakage of the working gas between all of these. For example, the stator sealing member 84 is an O-ring, a slipper seal, or another annular sealing member, and extends over the entire periphery along the peripheral surface of the valve stator 68.

The valve rotor 70 has a rotor low pressure flow path 88 and a rotor high pressure flow path 90. The rotor low pressure flow path 88 is a hole that penetrates the valve rotor 70, and the rotor high pressure flow path 90 is a recess portion formed in the valve rotor 70 or a hole that penetrates the valve rotor 70. The rotor low pressure flow path 88 and the rotor high pressure flow path 90 are located at mutually different places on a bottom surface of the valve rotor 70.

The rotor high pressure flow path 90 communicates with the high pressure chamber 92, and the high pressure chamber 92 communicates with the high pressure line 13a through a high pressure port 93. The high pressure chamber 92 is a space inside the valve housing 58, and the high pressure port 93 is a through-hole formed in the valve housing 58. The valve stator 68, the valve rotor 70, the rotor holder 72, the rotation member 74, and other components of the rotary valve 54 are disposed in the high pressure chamber 92.

Both the upper surface of the valve stator 68 and the bottom surface of the valve rotor 70 are flat surfaces, and are in surface contact with each other. When the valve rotor 70 rotates around the axis, the bottom surface of the valve rotor 70 rotationally slides on the upper surface of the valve stator 68. The surface contact between the valve rotor 70 and the valve stator 68 holds airtightness of the working gas circulating through the valve stator 68 and the valve rotor 70. In other words, a rotational sliding surface between the valve rotor 70 and the valve stator 68 has a high pressure gas region and a low pressure gas region. The regions are mutually sealed by a contact surface pressure between the valve rotor 70 and the valve stator 68. As will be described later, the low pressure gas region is located in a central portion of the rotational sliding surface, and the high pressure gas region is located in an outer peripheral portion of the rotational sliding surface that surrounds the low pressure gas region.

The rotor low pressure flow path 88 communicates with the stator low pressure flow path 68c, and the rotor high pressure flow path 90 communicates with the high pressure chamber 92. Due to the rotational sliding of the valve rotor 70 with respect to the valve stator 68, the regenerator flow path 68a is alternately connected to the rotor low pressure flow path 88 and the rotor high pressure flow path 90, thereby configuring the main intake valve V1 and the main exhaust valve V2. The drive chamber flow path 68b is alternately connected to the rotor low pressure flow path 88 and the rotor high pressure flow path 90, thereby configuring the auxiliary intake valve V3 and the auxiliary exhaust valve V4. The rotor high pressure flow path 90 and the rotor low pressure flow path 88 are alternately connected to the regenerator flow path 68a, and the rotor high pressure flow path 90 and the rotor low pressure flow path 88 are alternately connected to the drive chamber flow path 68b in different phases (for example, different phases by 180 degrees as described above).

As a specific flow path configuration of the rotary valve 54 including the valve stator 68 and the valve rotor 70 in this way, various known flow path configurations can be appropriately adopted. Accordingly, detailed description thereof will be omitted.

The rotation member 74 is configured to rotate the valve rotor 70 around the axis with respect to the valve stator 68. The rotation member 74 is connected to the rotor holder 72 via the rotor holder 72 so that the valve rotor 70 is rotated around the axis.

The upper surface of the rotation member 74 is fixed to a tip (lower end) of the motor shaft 56b. The rotation member 74 may be integrally formed with the motor shaft 56b, or may be fixed to the motor shaft 56b by an appropriate fixing member. Therefore, when the motor shaft 56b rotates, the rotation member 74 rotates around the axis together with the motor shaft 56b. As an example, the rotation member 74 has a disc shape or a column shape, and a diameter thereof is larger than a diameter of the motor shaft 56b.

The rotation member 74 is connected to the rotor holder 72 via the plurality of first connecting pins 76. The first connecting pin 76 is an elongated rod-shaped (for example, columnar) member extending in the axial direction C2. One end (upper end) of each first connecting pin 76 is inserted into a corresponding pin hole formed on the bottom surface of the rotation member 74. The other end (lower end) of each first connecting pin 76 is inserted into a corresponding pin hole formed on the upper surface of the rotor holder 72. The first connecting pin 76 is disposed at a position radially offset from a center axis (that is, a rotation axis) of the rotation member 74. The first connecting pin 76 configures a crank together with the rotation member 74. The first connecting pins 76 may be disposed at an equal angular interval in the circumferential direction in the outer peripheral portion of the bottom surface of the rotation member 74. The rotation member 74 may be connected to the rotor holder 72 via at least one first connecting pin 76.

In this way, the first connecting pin 76 connects the rotor holder 72 to the rotation member 74 so that the rotor holder 72 is rotatable around the axis together with the rotation member 74. When the rotation member 74 rotates, a rotation force (driving force in the circumferential direction) of the rotation member 74 is transmitted to the rotor holder 72 via the first connecting pin 76.

In addition, the first connecting pin 76 connects the rotor holder 72 to the rotation member 74 so that the rotor holder 72 is movable in the axial direction C2 with respect to the rotation member 74. Mutual sliding in the axial direction C2 can be performed between the rotor holder 72 and the first connecting pin 76, or between the rotation member 74 and the first connecting pin 76. In this manner, the rotor holder 72 is movable in the axial direction C2 with respect to the rotation member 74.

A first gap 96 is formed between the bottom surface of the rotation member 74 and the upper surface of the rotor holder 72, and the upper surface of the rotor holder 72 is not in contact with the bottom surface of the rotation member 74. Therefore, no force or almost no force is transmitted between the rotor holder 72 and the rotation member 74 in the axial direction C2. The first gap 96, that is, the axial distance between the rotor holder 72 and the rotation member 74 may be from 1 mm or longer, or may be 2 mm or longer, for example. The first gap 96 may be 5 mm or shorter, or may be 10 mm or shorter, for example.

The rotor holder 72 is connected to the valve rotor 70 to rotate around the axis together with the valve rotor 70. The rotor holder 72 is connected to the valve rotor 70 via the plurality of second connecting pins 78. The second connecting pin 78 is an elongated rod-shaped (for example, columnar) member extending in the axial direction C2. One end (upper end) of each second connecting pin 78 is inserted into a corresponding pin hole formed on the bottom surface of the rotor holder 72. The other end (lower end) of each second connecting pin 78 is inserted into a corresponding pin hole formed on the upper surface of the valve rotor 70. The second connecting pin 78 is disposed at a position radially offset from the center axis (that is, the rotation axis) of the rotor holder 72. The second connecting pins 78 may be disposed at an equal angular interval in the circumferential direction. The rotor holder 72 may be connected to the valve rotor 70 via at least one second connecting pin 78.

In this way, the second connecting pin 78 connects the rotor holder 72 to the valve rotor 70 so that the valve rotor 70 is rotatable around the axis together with the rotor holder 72. When the rotor holder 72 rotates, the rotation force (driving force in the circumferential direction) of the rotor holder 72 is transmitted to the valve rotor 70 via the second connecting pin 78.

The second connecting pin 78 connects the rotor holder 72 to the valve rotor 70 so that the rotor holder 72 is movable in the axial direction C2 with respect to the valve rotor 70. Mutual sliding in the axial direction C2 can be performed between the rotor holder 72 and the second connecting pin 78, or between the valve rotor 70 and the second connecting pin 78. In this manner, the rotor holder 72 is movable in the axial direction C2 with respect to the valve rotor 70.

A second gap 98 is formed between the bottom surface of the rotor holder 72 and the upper surface of the valve rotor 70, and the upper surface of the valve rotor 70 is not in contact with the bottom surface of the rotor holder 72 (however, the valve rotor 70 and the rotor holder 72 are in contact with each other in or near the rotor sealing member 82). Therefore, no or almost no force in the axial direction C2 is transmitted between the rotor holder 72 and the valve rotor 70. The rotor holder 72 is disposed apart from the valve rotor 70 via the second gap 98. Accordingly, a pressing force from the rotor holder 72 to the valve rotor 70 in the axial direction C2 does not excessively act. The second gap 98, that is, the axial distance between the rotor holder 72 and the valve rotor 70 may be 1 mm or longer, or may be 2 mm or longer, for example. The second gap 98 may be 5 mm or shorter, or may be 10 mm or shorter, for example.

The first connecting pin 76 may be integrally formed with either the rotation member 74 or the rotor holder 72. The first connecting pin 76 may be integrally formed on the bottom surface of the rotation member 74, may protrude downward in the axial direction from the rotation member 74, and may be inserted into a pin hole formed on the upper surface of the rotor holder 72. Alternatively, the first connecting pin 76 may be integrally formed on the upper surface of the rotor holder 72, may protrude upward in the axial direction from the rotor holder 72, and may be inserted into a pin hole formed on the lower surface of the rotation member 74. Similarly, the second connecting pin 78 may be integrally formed with either the rotor holder 72 or the valve rotor 70. The second connecting pin 78 may be integrally formed on the bottom surface of the rotor holder 72, may protrude downward in the axial direction from the rotor holder 72, and may be inserted into a pin hole formed on the upper surface of the valve rotor 70. Alternatively, the second connecting pin 78 may be integrally formed on the upper surface of the valve rotor 70, may protrude upward in the axial direction from the valve rotor 70, and may be inserted into a pin hole formed on the lower surface of the rotor holder 72.

The rotor holder 72 is supported by the valve bearing 80 to be rotatable around the axis. An outer peripheral side of the valve bearing 80 is fixed to the valve housing 58, and an inner peripheral side of the valve bearing 80 supports the rotor holder 72. The rotor holder 72 is supported to be movable in the axial direction C2 with respect to the valve bearing 80. An outer peripheral surface of the rotor holder 72 is slidable in the axial direction C2 with respect to the valve bearing 80.

In addition, the first spring 86 is interposed between the rotor holder 72 and the valve rotor 70. The first spring 86 is disposed between the lower surface of the rotor holder 72 and the upper surface of the valve rotor 70, and biases the rotor holder 72 against the valve rotor 70 in the axial direction C2 so that the rotor holder 72 is separated from the valve rotor 70.

As an example, the rotor holder 72 has a disc shape or a column shape. However, the rotor holder 72 has a holder central portion 72a and a holder outer peripheral portion 72b, which have mutually different axial thicknesses. The holder central portion 72a has a smaller axial thickness than the holder outer peripheral portion 72b. Therefore, the bottom surface of the rotor holder 72 is not flat, and the holder central portion 72a forms a recess portion recessed from the holder outer peripheral portion 72b. The second connecting pin 78 and the first spring 86 are disposed in the recess portion. The upper surface of the rotor holder 72 is flat except for the pin hole.

As an example, the valve rotor 70 has a disc shape or a column shape. However, the valve rotor 70 has a rotor central portion 70a and a rotor outer peripheral portion 70b, which have mutually different axial thicknesses. The rotor central portion 70a has a larger axial thickness than the rotor outer peripheral portion 70b. Therefore, the upper surface of the valve rotor 70 is not flat, and the rotor central portion 70a forms a projection portion projecting to the rotor holder 72 from the rotor outer peripheral portion 70b.

The recess portion on the bottom surface of the rotor holder 72 has a shape corresponding to the projection portion on the upper surface of the valve rotor 70. The inner diameter of the holder outer peripheral portion 72b is slightly larger than or substantially equal to the outer diameter of the rotor central portion 70a. The holder outer peripheral portion 72b is guided by the rotor central portion 70a to be movable (slidable) in the axial direction C2.

A rotor sealing member 82 is provided between the outer peripheral surface of the rotor central portion 70a and the inner peripheral surface of the holder outer peripheral portion 72b. For example, the rotor sealing member 82 is an O-ring, a slipper seal, or another annular sealing member, and extends over the entire periphery along the outer peripheral surface of the rotor central portion 70a. The rotor sealing member 82 prevents a leakage of the working gas from the outer peripheral portion (that is, the rotor outer peripheral portion 70b and the holder outer peripheral portion 72b) of the valve rotor 70 and the rotor holder 72 to the central portion (that is, the rotor central portion 70a and the holder central portion 72a) of the valve rotor 70 and the rotor holder 72.

The rotor low pressure flow path 88 is formed in the rotor central portion 70a, and the rotor high pressure flow path 90 is formed in the rotor outer peripheral portion 70b. The rotor low pressure flow path 88 penetrates the rotor central portion 70a in the axial direction C2. On the other hand, the rotor high pressure flow path 90 is a recess portion formed in the rotor outer peripheral portion 70b, and does not penetrate the rotor outer peripheral portion 70b. Therefore, on the upper surface of the valve rotor 70, the rotor outer peripheral portion 70b forms a step in the axial direction C2 with the rotor central portion 70a. The rotor holder 72 forms a low pressure section 94 having a pressure lower than the ambient pressure with the valve rotor 70 so that a force of pressing the valve rotor 70 against the valve stator 68 in the axial direction C2 is reduced. The ambient pressure is the pressure of the high pressure chamber 92, and is the high pressure PH during the operation of the cryocooler 10. The low pressure section 94 is a space formed between the rotor central portion 70a and the holder central portion 72a. The low pressure section 94 communicates with the stator low pressure flow path 68c through the rotor low pressure flow path 88. Therefore, the low pressure section 94 has the low pressure PL during the operation of the cryocooler 10. The low pressure section 94 is sealed from the high pressure chamber 92 by the rotor sealing member 82. Therefore, during the operation of the cryocooler 10, the pressure difference between the low pressure section 94 and the high pressure chamber 92 is held.

When the rotor sealing member 82 is not provided, the pressure of the low pressure section 94 becomes the high pressure PH as in the surroundings. In addition, even when the rotor low pressure flow path 88 does not penetrate the valve rotor 70, the pressure in the low pressure section 94 becomes the high pressure PH. In this way, when the low pressure section 94 is not present, the high pressure PH acts on the entire region of the upper surface of the valve rotor 70. On the other hand, in order to switch the flow path, the low pressure PL acts on a portion (central portion) of the bottom surface of the valve rotor 70. Therefore, a relatively large downward force acts on the valve rotor 70 in the axial direction C2 due to the pressure difference between the upper surface and the bottom surface, and the force acts to press the valve rotor 70 against the valve stator 68. An excessive pressing force increases a frictional resistance force caused by the rotational sliding of the valve rotor 70. The excessive pressing force may increase the required torque of the rotation drive source 56, or may accelerate abrasion of the valve rotor 70 or the valve stator 68. Therefore, the excessive pressing force is not preferable.

Since the low pressure section 94 is provided, the force of pressing the valve rotor 70 against the valve stator 68 in the axial direction C2 can be reduced. Therefore, it is possible to reduce the frictional resistance force caused by the rotational sliding of the valve rotor 70, and it is possible to suppress the increase in the required torque of the rotation drive source 56 or the abrasion of the valve rotor 70 or the valve stator 68.

Incidentally, when the rotor holder 72 and the rotation member 74 are integrated components, the pressure difference between the low pressure section 94 and the high pressure chamber 92 generates a force of pulling the integrated rotation component downward in the axial direction C2. In this case, the rotation member 74 is fixed to the motor shaft 56b. Accordingly, an axial force also acts on the motor shaft 56b so that the motor shaft 56b is pulled out from the motor main body 56a. The axial forces may apply an excessive axial load to the component inside the motor main body 56a, for example, such as the motor bearings 57. When the excessive load acts continuously, a life of the rotation drive source 56 may be shortened. In addition, when a configuration that withstands the axial force is adopted, manufacturing costs of the rotation drive source 56 may increase.

According to the embodiment, the rotation member 74 is connected to the rotor holder 72 via the rotor holder 72 to rotate the valve rotor 70 around the axis. The rotor holder 72 is disposed between the rotation member 74 and the valve rotor 70 in the axial direction C2, and is movable in the axial direction C2 with respect to the rotation member 74.

Therefore, when a downward force acts on the rotor holder 72 in the axial direction C2 due to the pressure difference between the ambient pressure and the low pressure section 94, the rotor holder 72 is movable downward in the axial direction C2 to be separated from the rotation member 74. The force acting on the rotor holder 72 in the axial direction C2 is not transmitted to the rotation member 74, and the rotation member 74 is held at an initial position without being pulled by the rotor holder 72. In general, the rotation member 74 is fixed to the motor shaft 56b, or forms a portion of the motor shaft 56b. Since the pulling force acting on the rotation member 74 in the axial direction C2 is reduced, the load applied to the motor component (for example, the motor bearing 57) is also reduced, and the rotation drive source 56 is durable for a longer period of time. The low pressure section 94 reduces the force of pressing the valve rotor 70 against the valve stator 68. Accordingly, the drive torque of the rotary valve 54 is also reduced. The rotation drive source 56 can be reduced in size and weight, and the cost can be reduced. Therefore, the drive torque of the rotary valve 54 of the cryocooler 10 can be reduced at a lower cost.

The rotor holder 72 is configured to move toward the valve rotor 70 side in the axial direction C2 due to the pressure difference between the ambient pressure and the low pressure section 94 during the operation of the cryocooler 10, and to move to the rotation member 74 side in the axial direction C2 during stopping of the cryocooler 10.

During the operation of the cryocooler 10, as illustrated in FIG. 3, the rotor holder 72 moves downward in the axial direction s to move away from the rotation member 74 and to move close to the valve rotor 70. The first spring 86 is compressed due to the pressure difference between the ambient pressure (high pressure PH) and the low pressure section 94. The first gap 96 is enlarged, and the second gap 98 is reduced.

In this way, the force in the axial direction C2 generated due to the pressure difference between the ambient pressure and the low pressure section 94 causes the axial movement of the rotor holder 72, and is not transmitted to the rotation member 74. During the operation of the cryocooler 10, the rotor holder 72 can be moved to a proper position with respect to the valve rotor 70.

On the other hand, during stopping of the cryocooler 10, as illustrated in FIG. 4, the rotor holder 72 moves upward in the axial direction to move close to the rotation member 74 and to move away from the valve rotor 70. The pressure difference between the ambient pressure and the low pressure section 94 is eliminated. Accordingly, the first spring 86 stretches, thereby reducing the first gap 96 and enlarging the second gap 98. In this way, the rotor holder 72 can move to the rotation member 74 side, and can return to the initial position.

In addition, the first connecting pin 76 connects the rotor holder 72 to the rotation member 74 so that the rotor holder 72 is rotatable around the axis together with the rotation member 74 and the rotor holder 72 is movable in the axial direction C2 with respect to the rotation member 74. The first connecting pin 76 extends in the axial direction C2.

In a certain configuration, the rotor holder 72 may be connected to the rotation member 74 by using a pin extending in the radial direction instead of the axial direction. In order to transmit a larger rotational torque from the rotation member 74 to the rotor holder 72, it is necessary to increase the size of the pin in the radial direction. However, in a configuration in which two members are connected to each other by the thick pin in the radial direction, the diameter of the pin increases, and the axial dimension of the connecting portion between the two members also increases, thereby leading to a size increase in the rotary valve 54. This configuration is not preferable.

In contrast, in a configuration in which the first connecting pin 76 extends in the axial direction C2, the diameter of the first connecting pin 76 can be relatively easily increased without increasing the size of the rotation member 74 and the rotor holder 72.

The second connecting pin 78 connects the rotor holder 72 to the valve rotor 70 so that the rotor holder 72 is rotatable around the axis together with the valve rotor 70 and the rotor holder 72 is movable in the axial direction C2 with respect to the valve rotor 70. The second connecting pin 78 is disposed in the low pressure section 94. According to this configuration, even when abrasion powder is generated in or near the second connecting pin 78 while the rotary valve 54 is used, the abrasion powder can be discharged from the low pressure section 94 to the low pressure line 13b. Therefore, the abrasion powder is less likely to reach the regenerator flow path 68a and the drive chamber flow path 68b, and thus, it is possible to suppress contamination of the cold head 14 which is caused by the abrasion powder.

In this regard, the high pressure port 93 and the rotor high pressure flow path 90 are provided on the lower side (that is, the valve stator 68 side) in the axial direction with respect to the first connecting pin 76. A flow of the working gas flowing from the high pressure port 93 into the high pressure chamber 92 has an axially upward component near the first connecting pin 76. Therefore, even when the abrasion powder is generated in or near the first connecting pin 76, the abrasion powder is less likely to reach the rotor high pressure flow path 90, and thus, it is possible to suppress the contamination of the cold head 14 which is caused by the abrasion powder.

Figure 5:
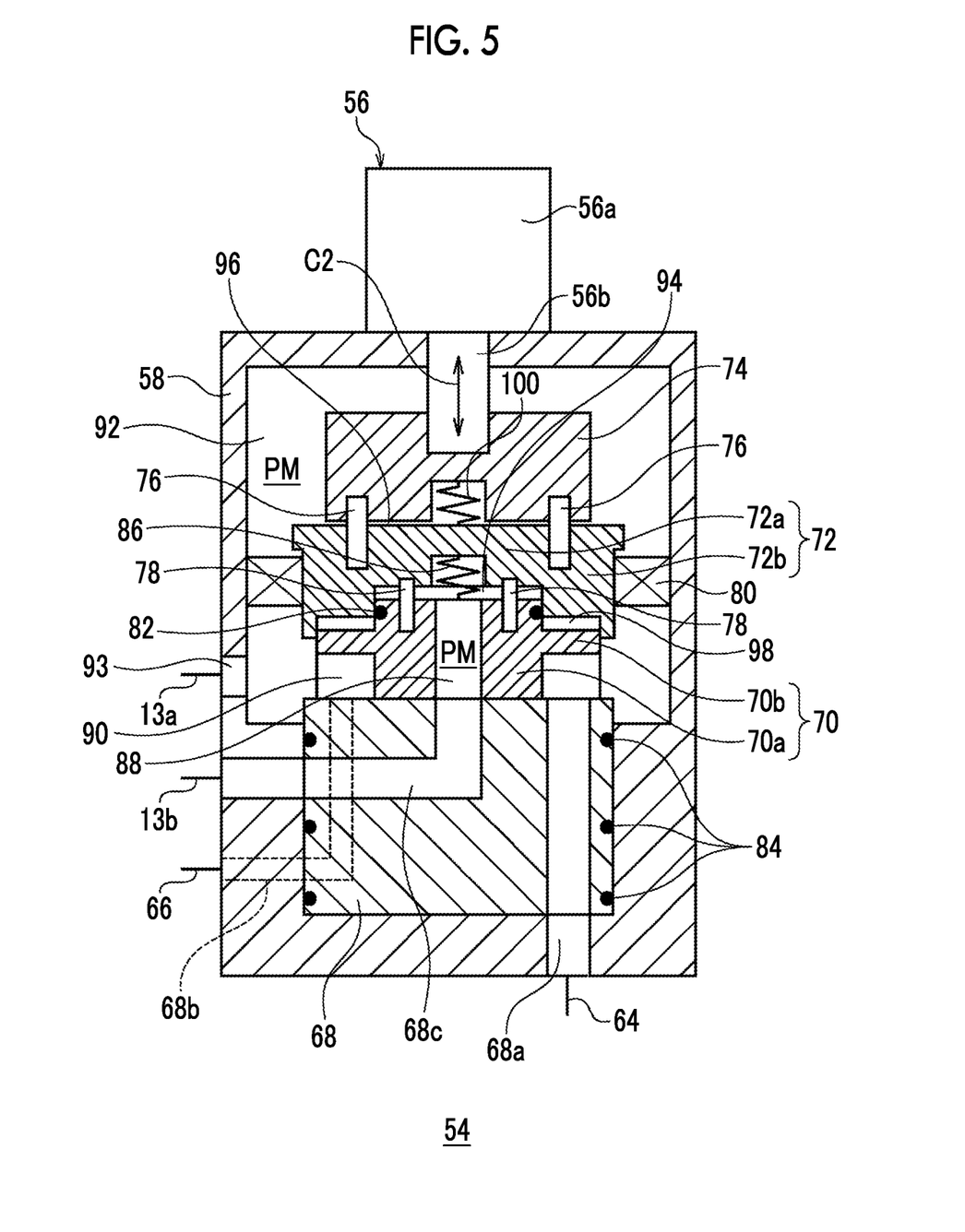
FIG. 5 is a view schematically illustrating another example of the rotary valve of the cryocooler according to the embodiment.

FIG. 5 is a view schematically illustrating another example of the rotary valve 54 of the cryocooler 10 according to the embodiment. The rotary valve 54 includes a first restriction member that restricts the axial movement of the rotor holder 72 to the rotation member 74 side. Here, the first restriction member is a second spring 100.

The second spring 100 is disposed between the rotor holder 72 and the rotation member 74, that is, in the first gap 96. The second spring 100 is disposed between the lower surface of the rotation member 74 and the upper surface of the rotor holder 72, and biases the rotor holder 72 against the rotation member 74 in the axial direction C2 so that the rotor holder 72 is separated from the rotation member 74.

When the rotor holder 72 moves upward in the axial direction C2 and the first gap 96 is narrowed, the second spring 100 is compressed, and elastically generates a force against the upward movement of the rotor holder 72. Therefore, the second spring 100 can restrict the axial movement of the rotor holder 72 to the rotation member 74.

As described above, in general, the rotor sealing member 82 is pinched between the bottom surface of the rotor holder 72 and the upper surface of the valve rotor 70. In this manner, the low pressure section 94 is sealed from the high pressure chamber 92. When the rotor holder 72 greatly moves to the rotation member 74 side, the rotor holder 72 is detached from the valve rotor 70, thereby causing a possibility that the low pressure section 94 may be incompletely sealed or cannot be sealed.

In contrast, the first restriction member such as the second spring 100 can restrict the axial movement of the rotor holder 72 to the rotation member 74 side. Therefore, it is possible to reduce the risk that the low pressure section 94 may not be sealed.

Figure 6:
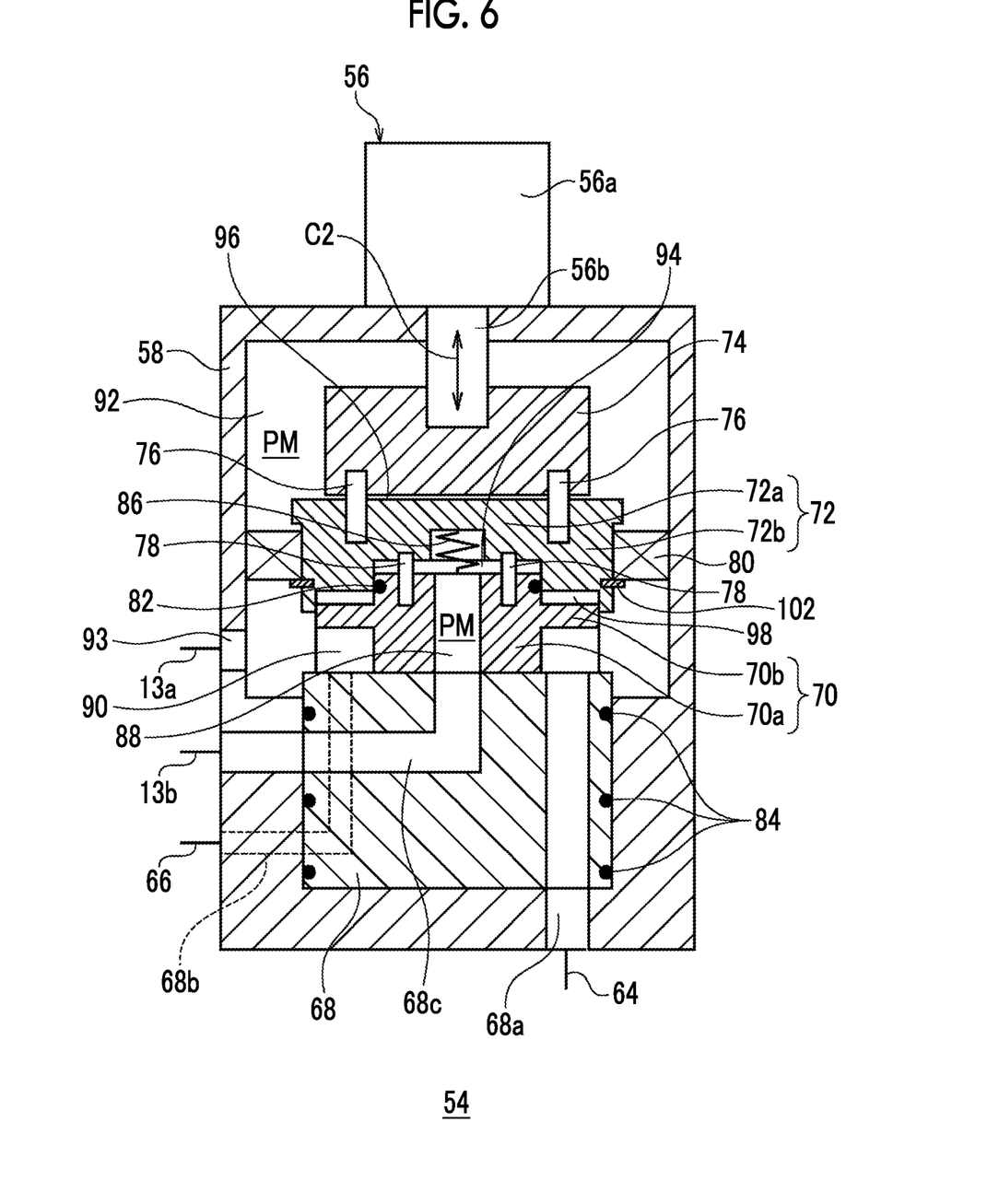
FIG. 6 is a view schematically illustrating another example of the rotary valve of the cryocooler according to the embodiment.

FIG. 6 is a view schematically illustrating another example of the rotary valve 54 of the cryocooler 10 according to the embodiment. The rotary valve 54 includes the first restriction member that restricts the axial movement of the rotor holder 72 to the rotation member 74 side. Here, the first restriction member is a restraint member 102.

The restraint member 102 is attached to the holder outer peripheral portion 72b adjacent to the lower side of the valve bearing 80 in the axial direction. The restraint member 102 is provided over the entire periphery of the rotor holder 72, or over at least a portion of the rotor holder 72 in the circumferential direction. During the operation of the cryocooler 10, the restraint member 102 is located slightly below the valve bearing 80. When the cryocooler 10 is stopped, and the pressure difference is eliminated as described above, the rotor holder 72 moves upward in the axial direction C2, and the first gap 96 is narrowed. At this time, the restraint member 102 engages with the valve bearing 80 to restrict the upward movement of the rotor holder 72. In this way, the restraint member 102 can restrict the axial movement of the rotor holder 72 to the rotation member 74 side, and can reduce the risk that the low pressure section 94 may not be sealed.

Figure 7:
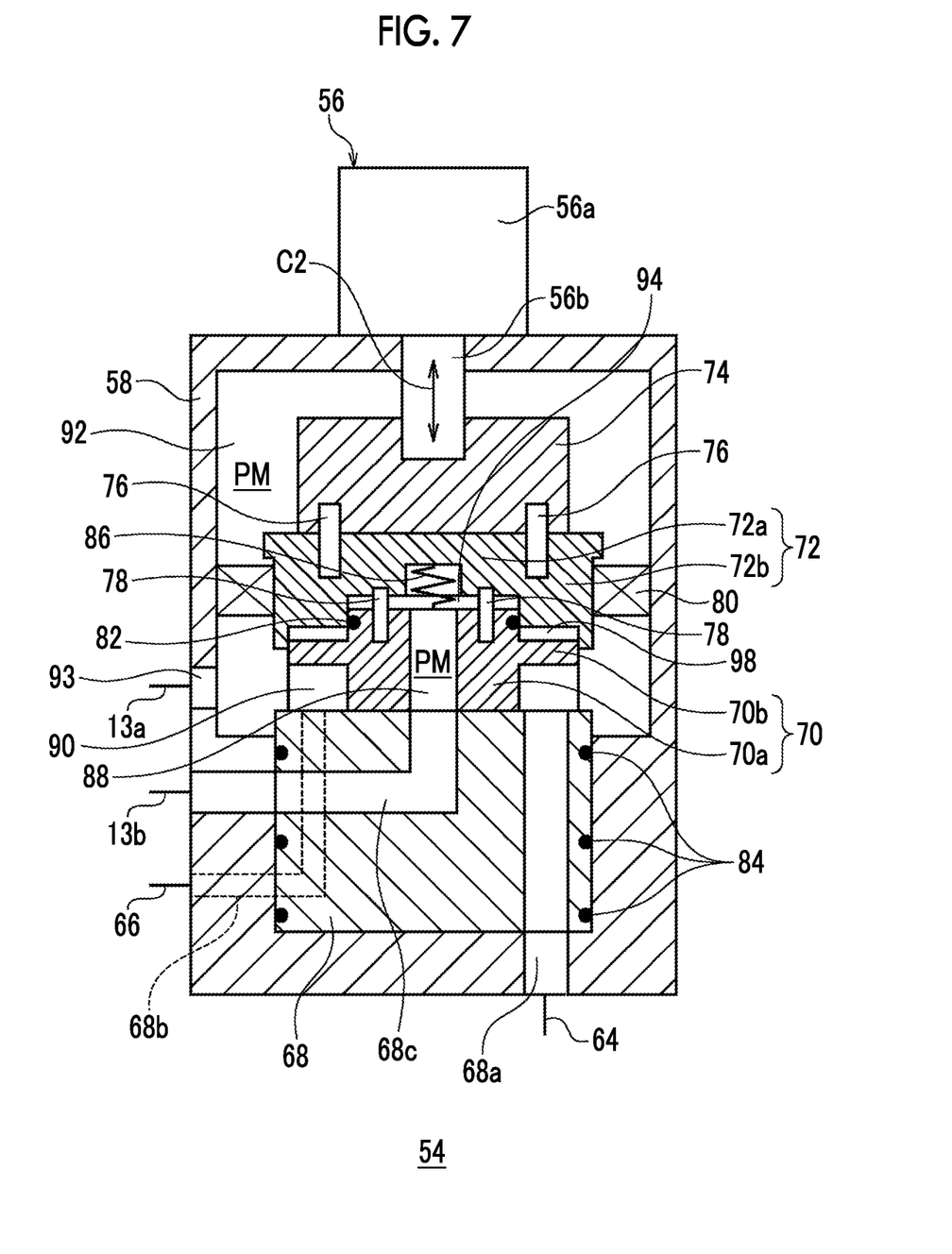
FIG. 7 is a view schematically illustrating another example of the rotary valve of the cryocooler according to the embodiment.

FIG. 7 is a view schematically illustrating another example of the rotary valve 54 of the cryocooler 10 according to the embodiment. The rotary valve 54 includes the first restriction member that restricts the axial movement of the rotor holder 72 to the rotation member 74 side. Here, the first restriction member is the rotation member 74.

During the operation of the cryocooler 10, as in each of the above-described embodiments, the rotor holder 72 is located slightly below the rotation member 74, and the first gap 96 is formed between the rotation member 74 and the rotor holder 72. When the cryocooler 10 is stopped, the pressure difference is eliminated as described above, and the rotor holder 72 moves upward in the axial direction C2. The rotor holder 72 comes into contact with the rotation member 74, thereby restricting the upward movement of the rotor holder 72. At this time, the first gap 96 is not present. In this way, the rotation member 74 can restrict the axial movement of the rotor holder 72 to the rotation member 74 side, and can reduce the risk that the low pressure section 94 may not be sealed.

Referring again to FIGS. 3 and 4, the rotary valve 54 includes a second restriction member that restricts the axial movement of the rotor holder 72 to the valve rotor 70 side. Here, the second restriction member is the valve bearing 80. The holder outer peripheral portion 72b of the rotor holder 72 has an engagement portion 104 adjacent to the upper side in the axial direction of the valve bearing 80. The engagement portion 104 is provided over the entire periphery of the rotor holder 72, or over at least a portion of the rotor holder 72 in the circumferential direction.

During stopping of the cryocooler 10, the engagement portion 104 is located at a position slightly above the valve bearing 80. During the operation of the cryocooler 10, as described above, the rotor holder 72 moves downward in the axial direction C2 due to the pressure difference between the ambient pressure and the low pressure section 94. The engagement portion 104 engages with the valve bearing 80, thereby restricting the downward movement of the rotor holder 72. In this manner, the second gap 98 is reliably formed between the rotor holder 72 and the valve rotor 70. In this way, the pressing force from the rotor holder 72 to the valve rotor 70 in the axial direction C2 does not excessively act. Therefore, the pressing force from the valve rotor 70 to the valve stator 68 can be properly maintained.

The present invention is not limited to the above-described embodiments and modification examples. The embodiments and modification examples may be combined with each other, or further modifications such as various design changes may be added thereto, based on the knowledge of those skilled in the art. However, the embodiments or the modification examples combined in this way or having further added modification are also included in the scope of the present invention. The above-described embodiments or modification examples, and a new embodiment acquired from the combination of the above-described embodiments or modification examples compatibly achieve respective advantageous effects of the combined embodiment, the combined modification example, and further modifications.

In the above-described embodiment, the bottom surface of the rotor holder 72 has the recess portion at the center, and the central projection portion of the upper surface of the valve rotor 70 enters the recess portion of the rotor holder 72. The rotor sealing member 82 is provided between the inner peripheral surface of the recess portion of the rotor holder 72 and the outer peripheral surface of the central projection portion of the valve rotor 70. However, conversely, the upper surface of the valve rotor 70 may have the recess portion at the center, and the central projection portion of the bottom surface of the rotor holder 72 enters into the recess portion of the valve rotor 70. The rotor sealing member 82 may be provided between the inner peripheral surface of the recess portion of the valve rotor 70 and the outer peripheral surface of the central projection portion of the rotor holder 72. Even in this case, the low pressure section 94 can be formed between the valve rotor 70 and the rotor holder 72.

An application of the rotary valve 54 according to the embodiment is not limited to the GM cryocooler. The rotary valve 54 is also applicable to a pulse tube cryocooler or other cryocoolers. For example, when the rotary valve 54 is applied to the pulse tube cryocooler, the regenerator flow path 68a is connected to the high temperature end of the regenerator of the cold head 14. The drive chamber flow path 68b is connected to a high temperature end of the pulse tube instead of the drive chamber.

Various features described with regard to a certain embodiment are also applicable to other embodiments. A new embodiment acquired from the combination compatibly achieves respective advantageous effects of the combined embodiments.

The present invention can be used in a field of the rotary valve of the cryocooler and the cryocooler.

It should be understood that the invention is not limited to the above-described embodiment, but may be modified into various forms on the basis of the spirit of the invention. Additionally, the modifications are included in the scope of the invention.

What is claimed is:

1. A rotary valve of a cryocooler, comprising:
   a valve stator;
   a valve rotor;
   a rotation member that rotates the valve rotor around an axis with respect to the valve stator;
   a rotor holder connected to the valve rotor so as to rotate around the axis together with the valve rotor, and forming a low pressure section having a pressure lower than an ambient pressure between the valve rotor and the rotor holder so as to reduce an axial force of pressing the valve rotor against the valve stator; and
   a valve bearing that supports the rotor holder to be rotatable around the axis,
   wherein the rotation member is connected to the rotor holder so as to rotate the valve rotor around the axis via the rotor holder, and
   the rotor holder is disposed between the rotation member and the valve rotor in an axial direction, and is movable in the axial direction with respect to the rotation member,
   wherein an outer periphery of the rotor holder comprises an engagement portion adjacent to an axially upper side of the valve bearing.

2. The rotary valve according to claim 1,
   wherein the rotor holder is configured to move to a valve rotor side in the axial direction due to a pressure difference between the ambient pressure and the low pressure section during an operation of the cryocooler, and to move to a rotation member side in the axial direction during stopping of the cryocooler.

3. A rotary valve of a cryocooler, comprising,
   a valve stator;
   a valve rotor;
   a rotation member that rotates the valve rotor around an axis with respect to the valve stator;
   a rotor holder connected to the valve rotor so as to rotate around the axis together with the valve rotor, and forming a low pressure section having a pressure lower than an ambient pressure between the valve rotor and the rotor holder so as to reduce an axial force of pressing the valve rotor against the valve stator; and
   a valve bearing that supports the rotor holder to be rotatable around the axis, wherein the rotation member is connected to the rotor holder so as to rotate the valve rotor around the axis via the rotor holder, and the rotor holder is disposed between the rotation member and the valve rotor in an axial direction, and is movable in the axial direction with respect to the rotation member, wherein the rotary valve further comprises:

a first restriction member that restricts an axial movement of the rotor holder to a rotation member side, wherein the first restriction member comprises a restraint member attached to an outer periphery of the rotor holder adjacent to an axially lower side of the valve bearing.

4. The rotary valve according to claim 1, further comprising:

a first connecting pin that connects the rotor holder to the rotation member so that the rotor holder is rotatable around the axis together with the rotation member, and so that the rotor holder is axially movable with respect to the rotation member, wherein the first connecting pin extends in the axial direction.

5. The rotary valve according to claim 1, further comprising:

a second connecting pin that connects the rotor holder to the valve rotor so that the rotor holder is rotatable around the axis together with the valve rotor, and so that the rotor holder is axially movable with respect to the valve rotor, wherein the second connecting pin is disposed in the low pressure section.

6. The rotary valve according to claim 1, wherein a second gap is formed between a bottom surface of the rotor holder and an upper surface of the valve rotor.

7. The rotary valve according to claim 1, wherein the valve rotor includes a rotor central portion and a rotor outer peripheral portion, which have mutually different axial thicknesses.

8. The rotary valve according to claim 7, wherein the low pressure section is formed between the rotor central portion and a central portion of the rotor holder.

9. The rotary valve according to claim 7, wherein the rotor central portion forms a projection portion projecting to the rotor holder from the rotor outer peripheral portion.

10. The rotary valve according to claim 7, wherein a rotor sealing member is provided between the outer peripheral surface of the rotor central portion and an inner peripheral surface of the rotor holder.

11. A cryocooler comprising:

a rotary valve, the rotary valve comprising:

a valve stator;

a valve rotor;

a rotation member that rotates the valve rotor around an axis with respect to the valve stator;

a rotor holder connected to the valve rotor so as to rotate around an axis together with the valve rotor, and forming a low pressure section having a pressure lower than an ambient pressure between the valve rotor and the rotor holder so as to reduce an axial force of pressing the valve rotor against the valve stator; and a valve bearing that supports the rotor holder to be rotatable around the axis, wherein the rotation member is connected to the rotor holder so as to rotate the valve rotor around the axis via the rotor holder, and the rotor holder is disposed between the rotation member and the valve rotor in an axial direction, and is movable in the axial direction with respect to the rotation member, wherein an outer periphery of the rotor holder comprises an engagement portion adjacent to an axially upper side of the valve bearing.

12. The rotary valve according to claim 1, further comprising:

a valve housing, wherein an outer peripheral side of the valve bearing is fixed to the valve housing, and an inner peripheral side of the valve bearing supports the rotor holder.

13. The rotary valve according to claim 1, wherein the rotor holder is supported to be movable in the axial direction with respect to the valve bearing.

* * * * *